(12) United States Patent
Morishima et al.

(10) Patent No.: US 8,120,231 B2
(45) Date of Patent: Feb. 21, 2012

(54) INERTIAL DRIVE ACTUATOR

(75) Inventors: Tetsuya Morishima, Hachioji (JP); You Kondoh, Yamato (JP)

(73) Assignee: Olympus Corporation, Tokyo (JP)

( * ) Notice: Subject to any disclaimer, the term of this patent is extended or adjusted under 35 U.S.C. 154(b) by 413 days.

(21) Appl. No.: 12/479,155

(22) Filed: Jun. 5, 2009

(65) Prior Publication Data

US 2009/0302711 A1 Dec. 10, 2009

(30) Foreign Application Priority Data

Jun. 5, 2008 (JP) ................................ 2008-147988

(51) Int. Cl.
*H01L 41/08* (2006.01)
(52) U.S. Cl. .................... 310/329; 310/323.02
(58) Field of Classification Search .................. 310/323, 310/329
See application file for complete search history.

(56) References Cited

U.S. PATENT DOCUMENTS

| | | | |
|---|---|---|---|
| 5,786,654 A * | 7/1998 | Yoshida et al. ............... 310/328 |
| 6,051,909 A * | 4/2000 | Shinke et al. ............ 310/316.01 |
| 6,188,161 B1 * | 2/2001 | Yoshida et al. ............... 310/328 |
| 6,677,691 B2 * | 1/2004 | Ebihara ...................... 310/12.06 |
| 6,936,951 B1 * | 8/2005 | Cheng et al. .................. 310/311 |
| 7,471,030 B2 * | 12/2008 | Bennett et al. ........... 310/323.17 |
| 7,732,985 B2 * | 6/2010 | Choi et al. .................... 310/328 |

FOREIGN PATENT DOCUMENTS

JP 08-340682 12/1996

* cited by examiner

*Primary Examiner* — Jaydi San Martin
(74) *Attorney, Agent, or Firm* — Scully, Scott, Murphy & Presser, P.C.

(57) ABSTRACT

There is provided an inertial drive actuator in which, a small-sizing is easy, including a first displacement generating mechanism of which, one end is adjacent to a fixed member, and a first displacement is generated in the other end thereof, a second displacement generating mechanism of which, one end is adjacent to the fixed member, and which generates a second displacement in the other end thereof, a driving mechanism which applies a voltage for displacing the first displacement generating mechanism and the second displacement generating mechanism, a vibration substrate which is connected to the other end of the first displacement generating mechanism and the other end of the second displacement generating mechanism, and which is displaceable in a plane in which, there exist a direction of the first displacement and a direction of the second displacement, a mobile object which is disposed to be facing the vibration substrate, and which moves with respect to the vibration substrate by an inertia with respect to a displacement of the vibration substrate, and a friction controlling mechanism which changes a frictional force between the mobile object and the vibration substrate.

18 Claims, 9 Drawing Sheets

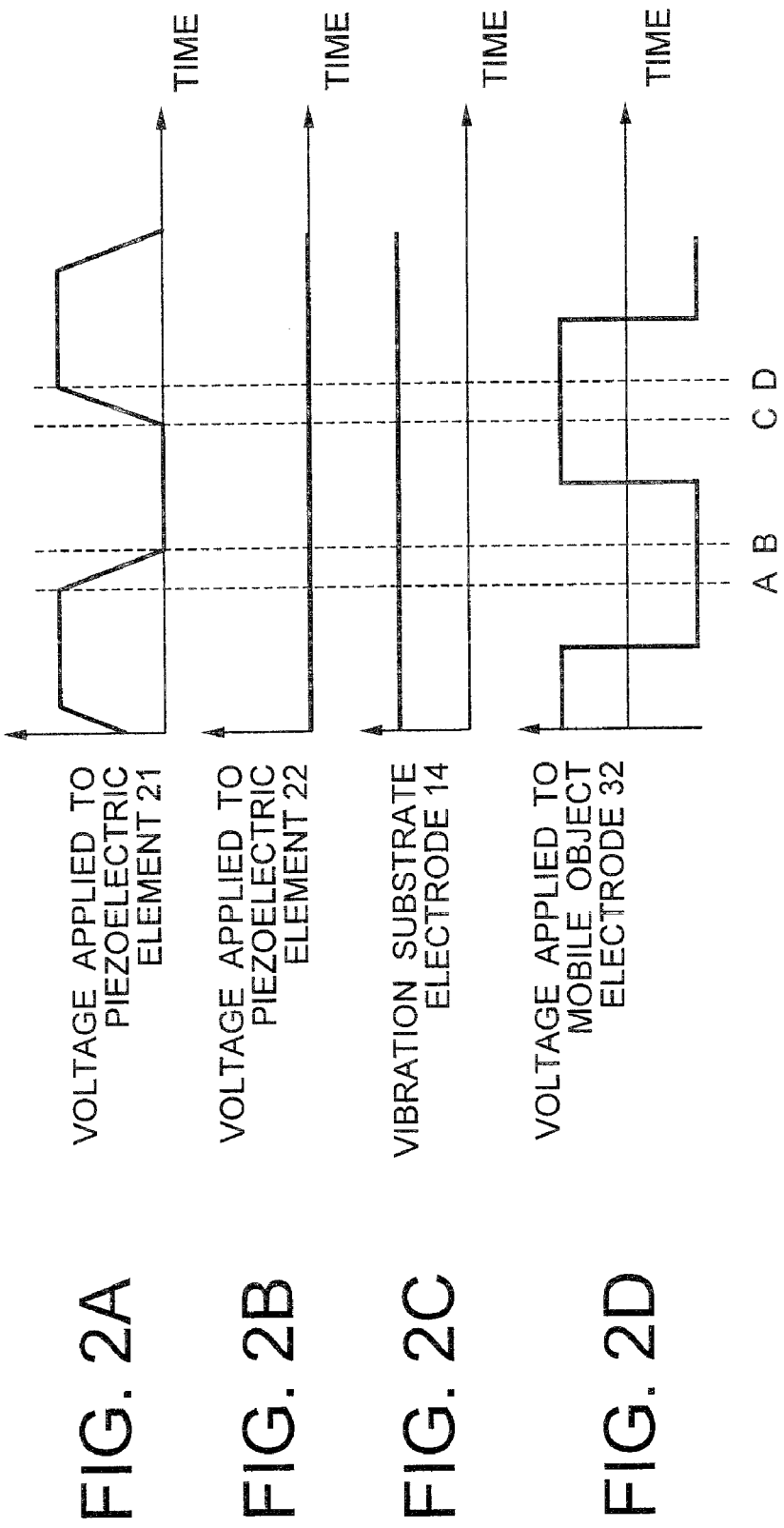

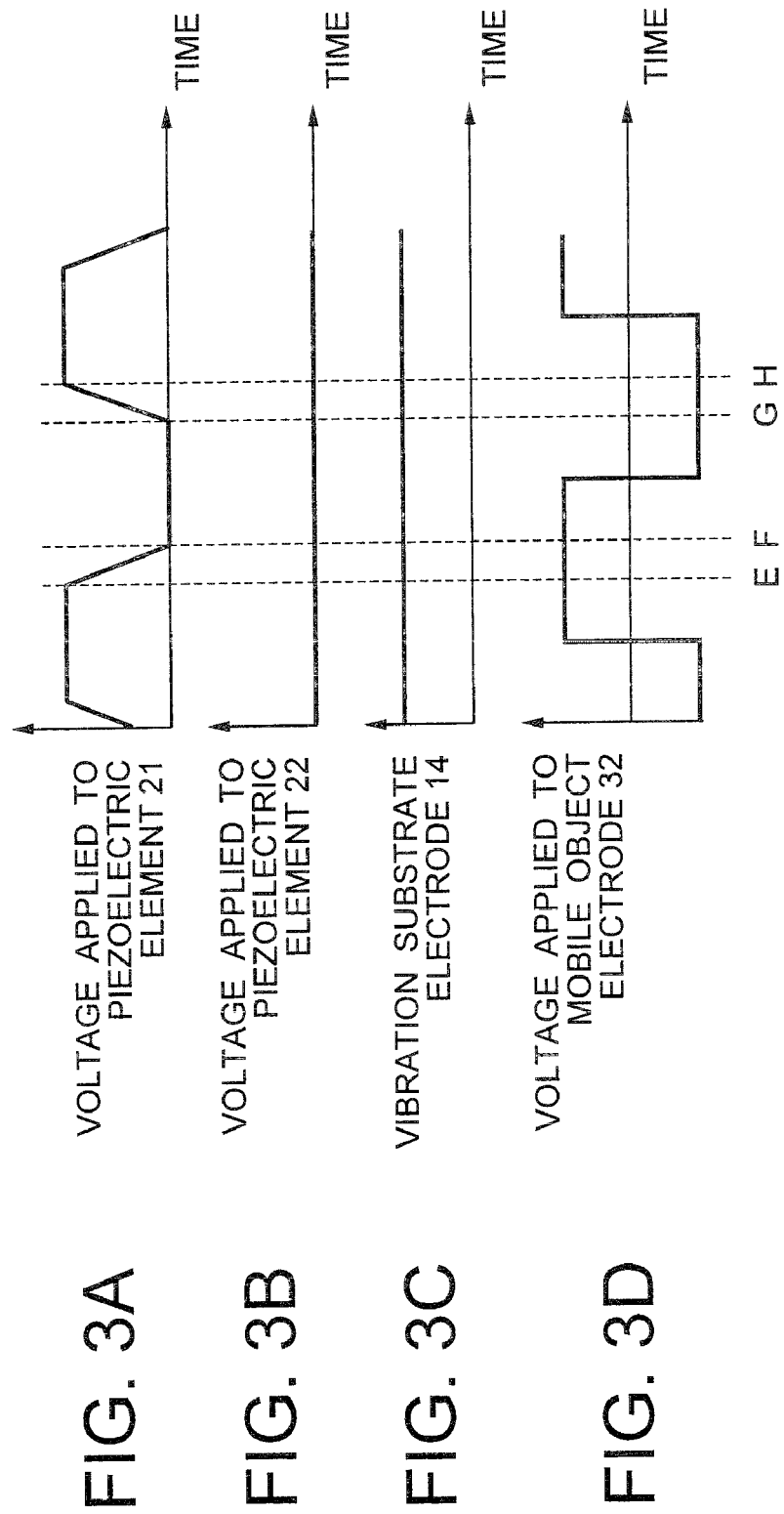

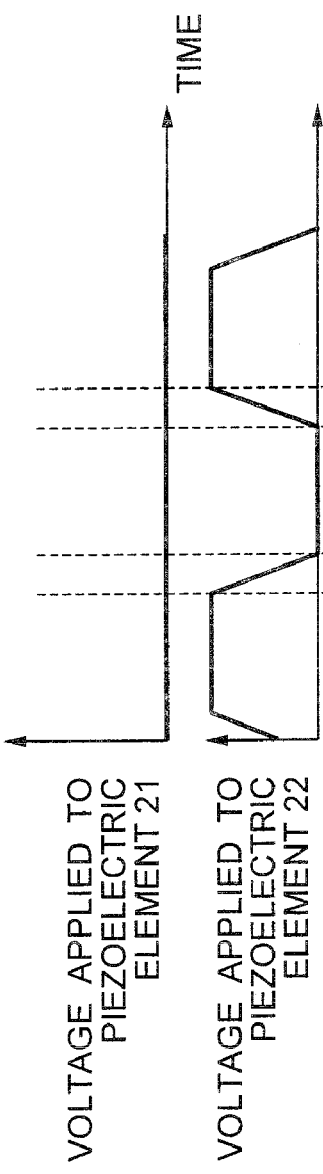
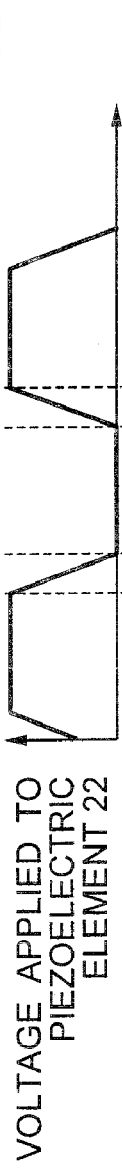
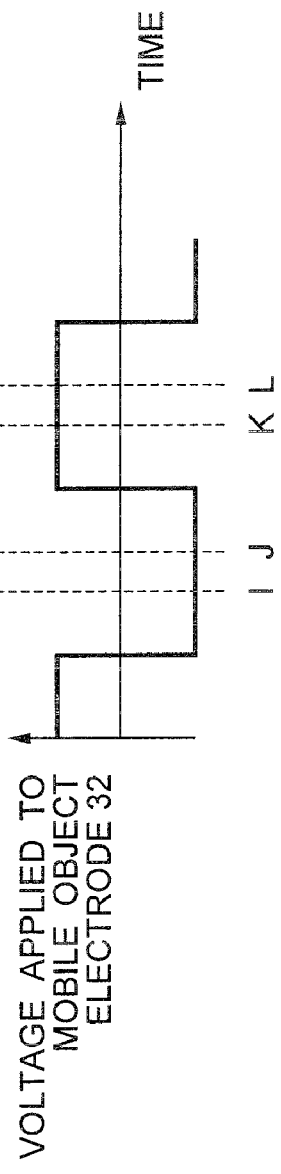
FIG. 4
FIG. 4A VOLTAGE APPLIED TO PIEZOELECTRIC ELEMENT 21
FIG. 4B VOLTAGE APPLIED TO PIEZOELECTRIC ELEMENT 22
FIG. 4C VIBRATION SUBSTRATE ELECTRODE 14
FIG. 4D VOLTAGE APPLIED TO MOBILE OBJECT ELECTRODE 32

INERTIAL DRIVE ACTUATOR

CROSS-REFERENCE TO RELATED APPLICATION

The present application is based upon and claims the benefit of priority from the prior Japanese Patent Application No. 2008-147988 filed on Jun. 5, 2008; the entire contents of which are incorporated herein by reference.

BACKGROUND OF THE INVENTION

1. Field of the Invention

The present invention relates to an inertial drive actuator

2. Description of the Related Art

As a conventional example of an actuator in which, a movement of an object is possible by using a driving mechanism in which, an electromechanical transducer is used, a mobile table 200 described in Japanese Patent Application Laid-open Publication No. Hei 8-340682 is available. The mobile table 200 will be described below by referring to FIG. 9. FIG. 9 is an exploded perspective view showing a structure of a conventional actuator.

The mobile table 200 includes an actuator 210 in X-axis direction and an actuator 220 in Y-axis direction. The actuator 210 in X-axis direction includes supporting blocks 213 and 214 which are slidably fitted without any slackness, on members 201a and 201b respectively, of a frame 201, a piezoelectric element 215, a drive shaft 216, a slider block 212, a pad 218, and a plate spring 219. The drive shaft 216 is supported to move freely in an axial direction by a bearing 213a and the supporting block 214 which are formed integrally with the supporting block 214. Moreover, one end of the piezoelectric element 215 is fixed by adhering to the supporting block 213, and the other end thereof is fixed by adhering to one end of the drive shaft 216. The drive shaft 216 is displaceable in X-axis direction by a displacement of the piezoelectric element 215 in a direction of thickness.

Moreover, the actuator 220 in Y-axis direction includes supporting blocks 223 and 224 which are slidably fitted without any slackness, on members 201c and 201d respectively, of the frame 201, a piezoelectric element 225, a drive shaft 226, the slider block 212, a pad 228, and a plate spring 229. The drive shaft 226 is supported to move freely in an axial direction by a bearing 223a and the supporting bock 224 which are formed integrally with the supporting bock 223. Moreover, one end of the piezoelectric element 225 is fixed by adhering to the supporting block 223, and the other end thereof is fixed by adhering to one end of the drive shaft 226. The drive shaft 226 is displaceable in Y-axis direction by a displacement of the piezoelectric element 225 in a direction of thickness. In the abovementioned structure, by driving the piezoelectric element 215 or the piezoelectric element 225, the slider block 212 is displaced via the drive shaft 216 or the drive shaft 226, and accordingly, a table T disposed on the slider block 212 is moved in X-axis direction and Y-axis direction.

However, in the mobile table 200 in FIG. 9, since a mechanism to be moved in X-axis direction and a mechanism to be moved in Y-axis direction are formed independently, the number of components in the structure becomes large, and a small-sizing has been difficult. Moreover, for moving the table T accurately, a parallelism of the frame 201 is important, and a deformation cannot be tolerated. Therefore, a manufacturing accuracy is sought, and small-sizing is difficult from that point of view as well.

SUMMARY OF THE INVENTION

The present invention is made in view of the abovementioned circumstances and an object of the present invention is to provide an inertial drive actuator in which, it is possible to make small the number of components, and to make a structure which doesn't need a high manufacturing accuracy, thereby making the small-sizing easy.

To solve the abovementioned issues and to achieve the object, according to the present invention, there can be provided an inertial drive actuator including a first displacement generating mechanism of which, one end is adjacent to a fixed member, and a first displacement is generated in the other end thereof, a second displacement generating mechanism of which, one end is adjacent to the fixed member, and a second displacement is generated in the other end thereof, a driving mechanism which applies a voltage for displacing the first displacement generating mechanism and the second displacement generating mean, a vibration substrate which is connected to the other end of the first displacement generating mechanism and the other end of the second displacement generating mechanism, and which is displaceable in a plane in which, there exist a direction of the first displacement and a direction of the second displacement, a mobile object which is disposed to be facing the vibration substrate, and which moves with respect to the vibration substrate by an inertia, with respect to a displacement of the vibration substrate, and a friction controlling mechanism, which changes a frictional force between the mobile object and the vibration substrate.

In the inertial drive actuator according to the present invention, it is preferable that the vibration substrate has a vibration substrate electrode, and the mobile object has a mobile object electrode at a position facing the vibration substrate electrode, and an insulating layer is disposed between the vibration substrate electrode and the mobile object electrode, and the friction controlling mechanism generates an electric potential difference between the mobile object electrode and the vibration substrate electrode, and changes the frictional force between the vibration substrate and the mobile object by an electrostatic force of attraction, based on the electric potential difference.

In the inertial drive actuator according to the present invention, it is preferable that the vibration substrate is displaceable in a direction which is not restricted to the direction of the first displacement and the direction of the second displacement, in the plane.

In the inertial drive actuator according to the present invention, the first displacement generating mechanism and the second displacement generating mechanism may be disposed such that the direction of the first displacement and the direction of the second displacement intersect in a plane.

In the inertial drive actuator according to the present invention, it is preferable that the first displacement generating mechanism is disposed near a center of the vibration substrate, and the second displacement generating mechanism is disposed at a position other than a position near the center of the vibration substrate such that, the direction of the first displacement and the direction of the second displacement are mutually parallel in the plane.

The inertial drive actuator according to the present invention may further include a third displacement generating mechanism which generates a third displacement, and the first displacement generating mechanism may be disposed near a center of the vibration substrate, and the second displacement generating mechanism may be disposed at a position other than a position near the center of the vibration substrate such that, the direction of the first displacement and the direction of the second displacement are mutually parallel in the plane, and the third displacement generating mechanism may be arranged at a position such that the direction of the first displacement and a direction of the third displacement intersect in the same plane.

In the inertial drive actuator according to the present invention, it is possible to form the mobile object of an electroconductive material.

In the inertial drive actuator according to the present invention, it is preferable that the vibration substrate and the mobile object include a permanent magnet disposed opposite, and the mobile object is formed of a magnetic material.

In the inertial drive actuator according to the present invention, the mobile objects may be in plurality, and it may be possible to control the plurality of mobile objects independently.

The inertial drive actuator according to the present invention includes a first displacement generating mechanism in which, a first displacement is generated, a second displacement generating mechanism which generates a second displacement, a driving mechanism which applies a voltage for displacing the first displacement generating mechanism and the second displacement generating mechanism, a vibration substrate which is connected to the first displacement generating mechanism and the second displacement generating mechanism, and which is displaceable in a plane in which, there exist a direction of the first displacement and a direction of the second displacement, a mobile object which is disposed to be facing the vibration substrate, and which moves with respect to the vibration substrate by an inertia with respect to a displacement of the vibration substrate, and a friction controlling mechanism which changes a frictional force between the mobile object and the vibration substrate.

BRIEF DESCRIPTION OF THE DRAWINGS

FIG. 2A, FIG. 2B, FIG. 2C, and FIG. 2D are graphs showing driving waveforms in a case of moving the mobile object according to the first embodiment in a leftward direction in FIG. 1A;

FIG. 3A, FIG. 3B, FIG. 3C, and FIG. 3D are graphs showing driving waveforms in a case of moving the mobile object according to the first embodiment in a rightward direction;

FIG. 4A, FIG. 4B, FIG. 4C, and FIG. 4D are graphs showing driving waveforms in a case of moving the mobile object according to the first embodiment in a downward direction;

DETAILED DESCRIPTION OF THE INVENTION

Exemplary embodiments of an inertial drive actuator according to the present invention will be described below in detail by referring to the accompanying diagrams. However, the present invention is not restricted to the embodiments described below.

(First Embodiment)

An inertial drive actuator 10 according to a first embodiment of the present invention will be described below while referring to diagrams from FIG. 1A to FIG. 5D. Here, FIG. 1 is a plan view showing a structure of the inertial drive actuator 10 according to the first embodiment, FIG. 1B is a cross-sectional view taken along a line IB-IB in FIG. 1A, and FIG. 1C is a partially enlarged view of a mobile object 31 and a vibration substrate 12 in FIG. 1A.

Figure 1A:
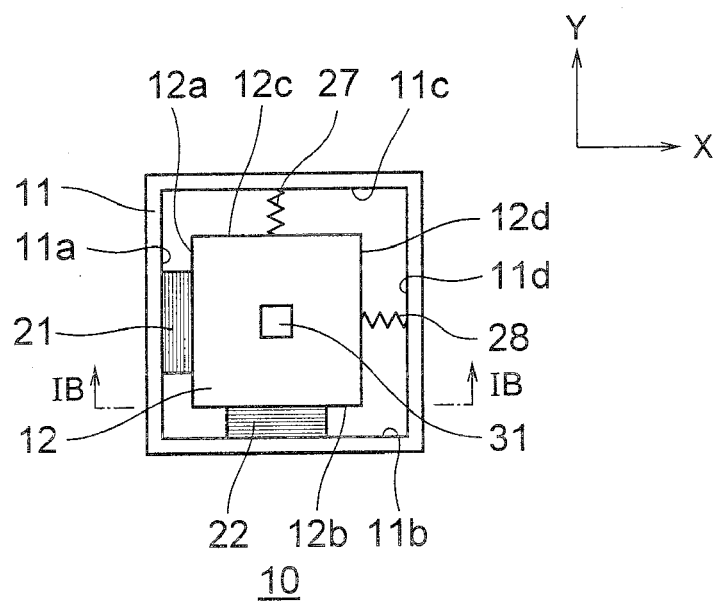
FIG. 1A is a plan view of an inertial drive actuator according to a first embodiment of the present invention.
Figure 1B:
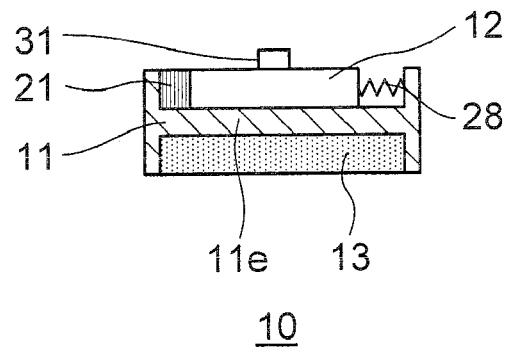
FIG. 1B is a cross-sectional view taken along a line IB-IB in FIG. 1A.

As shown in FIG. 1A and FIG. 1B, the inertial drive actuator 10 includes a fixed member 11, piezoelectric elements 21 and 22 as a first displacement generating means (a first displacement generating mechanism) and a second displacement generating means (a second displacement generating mechanism) respectively, the mobile object 31 and the vibration substrate 12 displaceably mounted on an intermediate plate 11e of the fixed member 11. Moreover, a permanent magnet 13 is disposed at a lower side of the intermediate plate 11e of the fixed member 11. One end of the piezoelectric element 21 and one end of the piezoelectric element 22 are adjacent to two inner-side surfaces 11a and 11b respectively, of the rectangular frame shaped fixed member 11. The other end of the piezoelectric element 21 and the other end of the piezoelectric element 22 are adjacent to a left-side surface 12a and a lower-side surface 12b respectively of the vibration substrate 12 having a rectangular shape in a plan view. When the piezoelectric elements 21 and 22 are arranged in such manner, a direction of displacement of the piezoelectric element 21 and a direction of displacement of the piezoelectric element 22 intersect in a plane in which the direction of displacement of the piezoelectric element 21 and the direction of displacement of the piezoelectric element 22 exist. It is preferable to form the mobile object 31 of a magnetic material and/or an electroconductive material.

Moreover, springs 27 and 28 are displaced to face the piezoelectric elements 21 and 22 via the vibration substrate 12. Concretely, one end of the spring 27 and one end of the spring 28 are adjacent to two inner-side surfaces 11c and 11d respectively of the fixed member 11, and the other end of the spring 27 and the other end of the spring 28 are adjacent to two side surfaces 12c and 12d respectively of the vibration substrate 12. In the inertial drive actuator 10, when the piezoelectric elements 21 and 22 elongates and the vibration substrate 12 is displaced, the springs 27 and 28 support the vibration substrate 12, and when the piezoelectric elements 21 and 22 contract, the vibration substrate 12 is displaced to an original position by an elastic force of the springs 27 and 28. In other words, the springs 27 and 28 assist transmission of the contraction of the piezoelectric elements 21 and 22 to the vibration substrate 12. Both ends of the piezoelectric elements 21 and 22 and both ends of the springs 27 and 28 may be fixed to the fixed member 11 and/or the vibration substrate 12 respectively.

Figure 1C:
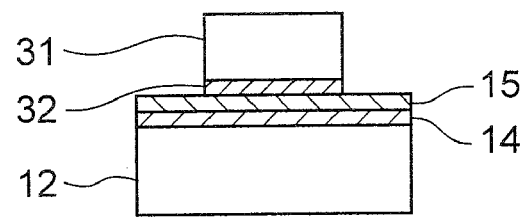
FIG. 1C is a partially enlarged view of FIG. 1B, showing a structure of a mobile object and a vibration substrate.
Figure 5:
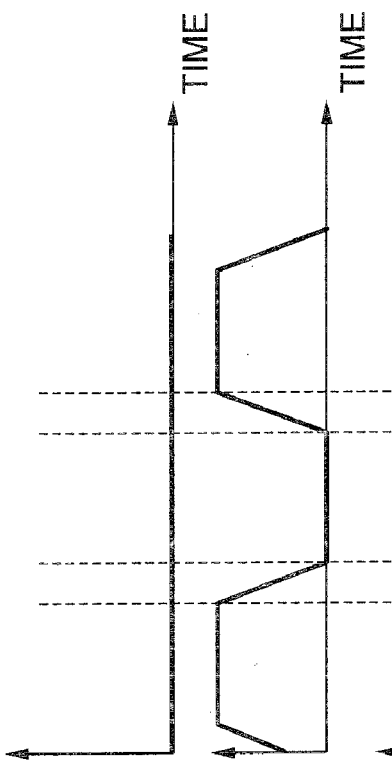
FIG. 5A, FIG. 5B, FIG. 5C, and FIG. 5D are graphs showing driving waveforms in a case of moving the mobile object according to the first embodiment in an upward direction.

As shown in FIG. 1C, a vibration substrate electrode 14 is formed on an upper surface of the vibration substrate 12, and an insulating layer 15 is formed on an upper surface of the vibration substrate electrode 14. On the other hand, a mobile object electrode 32 is formed on a lower surface of the mobile object 31, facing the vibration substrate 12.

Moreover, it is not shown in the diagram but, driving circuits (driving mechanism) for applying a drive voltage for displacing the piezoelectric elements 21 and 22 are connected to the piezoelectric element 21 and 22 respectively. Furthermore, a friction control circuit (a friction controlling mechanism) (not shown in the diagram) which applies a voltage for generating an electric potential difference between the mobile object 31 and the vibration substrate 12, and changes a frictional force between the vibration substrate 12 and the mobile object 31 by an electrostatic force of attraction based on the electric potential difference generated is connected to the mobile object electrode 32 and the vibration substrate electrode 14. The control of the displacement of the piezoelectric elements 21 and 22 can be carried out independently.

Moreover, although the abovementioned friction controlling means is for changing the frictional force between the mobile object 31 and the vibration substrate 12 by the electrostatic force of attraction based on the electric potential difference, without restricting to this, the friction controlling means may be a mechanism in which some other force such as a magnetic adsorption force is used, or maybe a mechanism which changes the frictional force between the mobile object 31 and the vibration substrate 12.

According to the structure described above, when the drive voltage is applied to the piezoelectric element 21 and/or the piezoelectric element 22, the vibration substrate 12 is displaced in a plane in which, there exist a direction of displacement of the piezoelectric element 21 and a direction of displacement of the piezoelectric element 22. When the vibration substrate 12 is displaced in such manner, the mobile object 31 on the vibration substrate 12 can move by inertia.

Here, the direction in which the vibration substrate 21 is displaced is not restricted to the direction of displacement of the piezoelectric element 21 and the direction of displacement of the piezoelectric element 22. For instance, when the drive voltage is applied to both the piezoelectric element 21 and the piezoelectric element 22, by the direction of displacement of the piezoelectric element 21 and the direction of displacement of the piezoelectric element 22 intersecting on the same plane, the vibration substrate 12 is displaced in a direction in which the direction of displacement of the piezoelectric element 21 and the direction of displacement of the piezoelectric element 22 are crossed.

Consequently, the vibration substrate 12 can be displaced in the direction of displacement of the piezoelectric element 21 (a direction of first displacement) or the direction of displacement of the piezoelectric element 22 (a direction of second displacement) or the direction in which the direction of the first displacement and the direction of the second displacement are crossed.

Next, a driving principle of the inertial drive actuator 10 will be described below by referring to FIG. 2A to FIG. 2D, FIG. 3A to FIG. 3D, FIG. 4A to FIG. 4D, and FIG. 5A to FIG. 5D.

Firstly, a case in which the mobile object 31 is moved in a leftward direction will be described below while referring to FIG. 2A to FIG. 2D. Diagrams from FIG. 2A to FIG. 2D are graphs showing driving waveforms in the case of moving the mobile object 31 in the leftward direction, where, FIG. 2A is a graph showing a voltage applied to the piezoelectric element 21, FIG. 2B is a graph showing a voltage applied to the piezoelectric element 22, FIG. 2C is a graph showing a voltage applied to the vibration substrate electrode 14, and FIG. 2D is a graph showing a voltage applied to the mobile object electrode 32.

Between a point of time A and a point of time B shown in FIG. 2A to FIG. 2D, a waveform applied to the piezoelectric element 21 from a driving circuit not shown in the diagram falls steeply (FIG. 2A), and the piezoelectric element 21 adjacent to the left-side surface 12a of the vibration substrate 12 contracts rapidly, and the vibration substrate 12 is displaced rapidly in the leftward direction. On the other hand, between the point of time A and the point of time B, an electric potential difference is generated between a voltage applied to the vibration substrate electrode 14 provided on the vibration substrate 12 (FIG. 2C), and a voltage applied to the mobile object electrode 32 provided on the mobile object 31 (FIG. 2D). Therefore, an electrostatic adsorption force acts between the vibration substrate 12 and the mobile object 31, and the frictional force is increased during this period. Consequently, the mobile object 31 also moves in the leftward direction together with the displacement of the vibration substrate 12.

Whereas, between a point of time C and a point of time D in the diagrams from FIG. 2A to FIG. 2D, a waveform applied to the piezoelectric element 21 rises steeply, and with the piezoelectric element 21 displacing rapidly in a rightward direction, the vibration substrate 12 is also displaced rapidly in the rightward direction. At this time, the voltage applied to the vibration substrate electrode 14 of the vibration substrate 12 and the voltage applied to the mobile object electrode 32 of the mobile object 31 are let to be the same electric potential. Therefore, the electrostatic adsorption force is not generated between the vibration substrate 12 and the mobile object 31. Consequently, due to the inertia of the mobile object 31, the mobile object 31 stays at that position.

By repeating an operation from the point of time A to the point of time B, and an operation from the point of time C to the point of time D as described above, the mobile object 31 moves in the leftward direction with respect to the vibration substrate 12. In the example shown in FIG. 2A to FIG. 2D, since the drive voltage is not applied to the piezoelectric element 22, the mobile object 31 is not displaced in a vertical direction (FIG. 2B).

Next, a case in which the mobile object 31 is moved in a rightward direction will be described below by referring to the diagrams from FIG. 3A to FIG. 3D. The diagrams from FIG. 3A to FIG. 3D are graphs showing driving waveforms in the case of moving the mobile object 31 in the rightward direction, where, FIG. 3A is a graph showing a voltage applied to the piezoelectric element 21, FIG. 3B is a graph showing a voltage applied to the piezoelectric element 22, FIG. 3C is a graph showing a voltage applied to the vibration substrate electrode 14, and FIG. 3D is a graph showing a voltage applied to the mobile object electrode 32.

As shown in FIG. 3A to FIG. 3D, between a point of time E and a point of time F, a waveform applied to the piezoelectric element 21 falls steeply (FIG. 3A), and the piezoelectric element 21 contracts and the vibration substrate 12 is displaced rapidly in the leftward direction. During this period, the voltage applied to the vibration substrate electrode 14 of the vibration substrate 12 (FIG. 3C) and the voltage applied to the mobile object electrode 32 of the mobile object 31 (FIG. 3D) are let to be the same electric potential. Therefore, the electrostatic adsorption force is not generated between the vibration substrate 12 and the mobile object 31. Consequently, due to the inertia of the mobile object 31, the mobile object 31 stays at that position.

Whereas, between a point of time G and a point of time H in the diagrams from FIG. 3A to FIG. 3D, the voltage applied to the piezoelectric element 21 rises steeply, and with the piezoelectric element 21 displacing rapidly in the rightward direction, the vibration substrate 12 is also displaced rapidly in the rightward direction. During this period, an electric potential difference is generated between the voltage applied to the vibration substrate electrode 14 of the vibration substrate 12 and the voltage applied to the mobile object electrode 32 of the mobile object 31.

Therefore, the electrostatic adsorption force acts between the vibration substrate 12 and the mobile object 31, and the frictional force increases. Consequently, with the displacement of the vibration substrate 12, the mobile object 31 also moves in the rightward direction.

As it has been described above, by repeating an operation from the point of time E to the point of time F, and an operation from the point of time G to the point of time H, the mobile object 31 moves in the rightward direction with respect to the vibration substrate 12. In the example shown in FIG. 3A to FIG. 3D, since the drive voltage is not applied to the piezoelectric element 22, the mobile object 31 is not displaced in the vertical direction (FIG. 3B).

Next, a case in which the mobile object 31 is moved in a downward direction will be described below by referring to the diagrams from FIG. 4A to FIG. 4D. The diagrams from FIG. 4A to FIG. 4D are graphs showing driving waveforms in the case of moving the mobile object 31 in the downward direction, where, FIG. 4A is a graph showing the voltage applied to the piezoelectric element 21, FIG. 4B is a graph showing the voltage applied to the piezoelectric element 22, FIG. 4C is a graph showing the voltage applied to the vibration substrate electrode 14, and FIG. 4D is a graph showing the voltage applied to the mobile object electrode 32.

As shown in FIG. 4A to FIG. 4D, between a point of time I and a point of time J, a waveform applied to the piezoelectric element 22 falls steeply (FIG. 4B), and the piezoelectric element 22 adjacent to a lower-side surface 12b of the vibration substrate 12 contracts, and the vibration substrate 12 is displaced rapidly in the downward direction. During this period, an electric potential difference is generated between the voltage applied to the vibration substrate electrode 14 of the vibration substrate 12 (FIG. 4C), and the voltage applied to the mobile object electrode 32 of the mobile object 31 (FIG. 4D). Therefore, the electrostatic adsorption force acts between the vibration substrate 12 and the mobile object 31, and the frictional force increases. Consequently, the mobile object 31 also moves in the downward direction together with the displacement of the vibration substrate 12.

Whereas, between a point of time K and a point of time L in the diagrams from FIG. 4A to FIG. 4D, a waveform applied to the piezoelectric element 22 rises steeply, and with the piezoelectric element 22 displacing rapidly in the upward direction, the vibration substrate 12 is also displaced rapidly in the upward direction. At this time, the voltage applied to the vibration substrate electrode 14 of the vibration substrate 12 and the voltage applied to the mobile object electrode 32 of the mobile object 31 are let to be the same electric potential. Therefore, the electrostatic adsorption force is not generated between the vibration substrate 12 and the mobile object 31. Consequently, due to the inertia of the mobile object 31, the mobile object 31 stays at that position.

By repeating an operation from the point of time I to the point of time J, and an operation from the point of time K to the point of time L as described above, the mobile object moves in the downward direction with respect to the vibration substrate 12. In the example shown in FIG. 4A to FIG. 4D, since the drive voltage is not applied to the piezoelectric element 21, the mobile object 31 is not displaced in the leftward and rightward directions (FIG. 4A).

Next, a case in which the mobile object 31 is moved in the upward direction will be described below by referring to the diagrams from FIG. 5A to FIG. 5D. The diagrams from FIG. 5A to FIG. 5D are graphs showing driving waveforms in the case of moving the mobile object in the upward direction, where, FIG. 5A is a graph showing the voltage applied to the piezoelectric element 21, FIG. 5B is a graph showing the voltage applied to the piezoelectric element 22, FIG. 5C is a graph showing the voltage applied to the vibration substrate electrode 14, and FIG. 5D is a graph showing the voltage applied to the mobile object electrode 32.

As shown in FIG. 5A to FIG. 5D, between a point of time M and a point of time N, a waveform applied to the piezoelectric element falls steeply (FIG. 5B), and the piezoelectric element 22 adjacent to the lower-side surface of the vibration substrate 12 contracts and the vibration substrate 12 is displaced rapidly in the downward direction. During this period, the voltage applied to the vibration substrate electrode 14 of the vibration substrate 12 (FIG. 5C) and the voltage applied to the mobile object electrode 32 of the mobile object 31 (FIG. 5D) are let to be the same electric potential. Therefore, the electrostatic force of attraction is not generated between the vibration substrate 12 and the mobile object 31. Consequently, due to the inertia of the mobile object 31, the mobile object 31 stays at that position.

Whereas, between a point of time O and a point of time P in the diagrams from FIG. 5A to FIG. 5D, a waveform applied to the piezoelectric element 22 rises steeply, and with the piezoelectric element 21 displacing rapidly in the upward direction, the vibration substrate 12 is also displaced rapidly in the upward direction. At this time, an electric potential difference is generated between the voltage applied to the vibration substrate electrode 14 of the vibration substrate 12 and the voltage applied to the mobile object electrode 32 of the mobile object 31. Therefore, the electrostatic adsorption force acts between the vibration substrate 12 and the mobile object 31, and the frictional force increases. Consequently, with the displacement of the vibration substrate 12, the mobile object 31 also moves in the upward direction.

As it has been described above, by repeating an operation from the point of time M to the point of time N, and an operation from the point of time O to the point of time P, the mobile object 31 moves in the upward direction with respect to the vibration substrate 12. In the example shown in FIG. 5A to FIG. 5D, since the drive voltage is not applied to the piezoelectric element 21, the mobile object 31 is not displaced in the leftward and the rightward directions (FIG. 5A).

As it has been described above, in the inertial drive actuator 10, it is possible to carry out the movement of the mobile object 31 in X-axis direction (leftward and rightward directions) and in Y-axis direction (vertical (upward and downward) direction) by one vibration substrate 14. Concretely, a vibrational displacement of each piezoelectric element is transmitted to the mobile object via a single vibration substrate, and the mobile object is displaced. Therefore, an effect is shown that it is appropriate for small-sizing with less number of components, and without having an independent mechanism. Moreover, a manufacturing accuracy is not sought strictly, and it is appropriate for small-sizing from that point of view as well. In the first embodiment, the description has been made by referring to a structure in which the mobile object is smaller than the vibration substrate. However, the mobile object may be let to be larger than the vibration substrate, and the mobile object of the inertial drive actuator is not to be restricted by the size of the vibration substrate.

When the voltage is applied simultaneously to the two piezoelectric elements 21 and 22, it is possible to displace the vibration substrate 12 not in the direction of displacement of the piezoelectric element 21 and the direction of displacement of the piezoelectric element 22, but also in an inclined direction which is not restricted to these directions. Accordingly, it is possible to move the mobile object 31 in an arbitrary direction in a plane which includes the direction of displacement of the piezoelectric element 21 and the direction of displacement of the piezoelectric element 22.

(Second Embodiment)

Figure 6A:
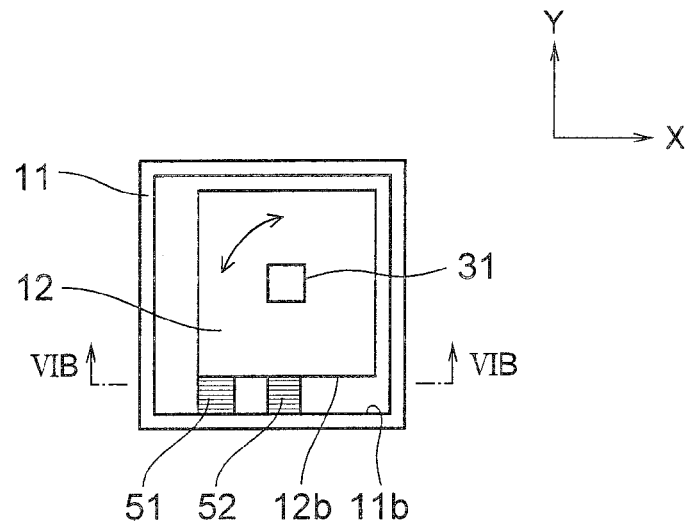
FIG. 6A is a plan view showing a structure of an inertial drive actuator according to a second embodiment of the present invention.
Figure 6B:
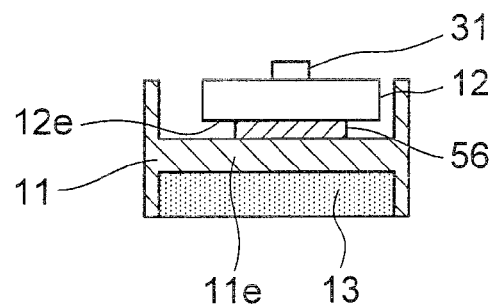
FIG. 6B is a cross-sectional view taken along a line VIB-VIB in FIG. 6A.

Next, an inertial drive actuator 40 according to a second embodiment of the present invention will be described below while referring to FIG. 6A and FIG. 6B. FIG. 6A is a plan view showing a structure of the inertial drive actuator 40 according to the second embodiment, and FIG. 6B is a cross-sectional view taken along a line VIB-VIB in FIG. 6A.

As shown in FIG. 6A, in the inertial drive actuator 40 according to the second embodiment, one end of a piezoelectric element 51 (displacement generating mechanism) is disposed adjacent to a left end of the lower-side surface 12b of the vibration substrate 12, and one end of a piezoelectric element 52 (displacement generating mechanism) is disposed adjacent to a substantial central of the lower-side surface 12b of the vibration substrate 12.

The other end of the piezoelectric element 51 and the other end of the piezoelectric element 52 are disposed adjacent to the inner-side surface 11b of the fixed member 11. Here, the piezoelectric element 51 may be arranged at any position on the lower-side surface 12b, provided that it is a position other than a central position.

In other words, the piezoelectric element 52 is disposed near a center of the vibration substrate 12, and the piezoelectric element 51 is disposed at a position other than a position near the center of the vibration substrate 12. Moreover, by disposing the piezoelectric element 51 and the piezoelectric element 52 in such manner, since the piezoelectric element 51 and the piezoelectric element 52 are displaced in Y-direction, a direction of displacement of the piezoelectric element 51 and a direction of displacement of the piezoelectric element 52 are mutually parallel in a plane which includes the direction of displacement of the piezoelectric element 51 and the direction of displacement of the piezoelectric element 52.

Moreover, as shown in FIG. 6B, an elastic member 56 is adhered on a lower surface 12e of the vibration substrate 12, in other words, on a side opposite to the mobile object 31, at a substantial center of the vibration substrate 12 in a plan view. Furthermore, the elastic member 56 is mounted on the intermediate plate 11e of the fixed member 11. Accordingly, transmission of the contraction of the piezoelectric elements 51 and 52 to the vibration substrate 12 is assisted. In the inertial drive actuator 40 according to the second embodiment, the abovementioned point differs from the inertial drive actuator 10 according to the first embodiment. The rest of the structure of the inertial drive actuator 40 according to the second embodiment is similar to the structure of the inertial drive actuator 10 according to the first embodiment, and same reference numerals are assigned to components which are same as in the first embodiment.

In this manner, by disposing the piezoelectric element 52 at a position other than the position near the center of the vibration substrate 12, the vibration substrate 12 undergoes rotational movement with the elastic member 56 as a center, with the contraction of the piezoelectric element 51. At this time, when the electric potential difference between the vibration substrate electrode 14 and the mobile object electrode 32 is set similarly as in the inertial drive actuator 10 according to the first embodiment, it is possible to control the frictional force between the mobile object 31 and the vibration substrate 12, and accordingly, the mobile object 31 undergoes a rotational movement as shown by an arrow in FIG. 6A, or moves drawing a predetermined trajectory.

(Third Embodiment)

Figure 7A:
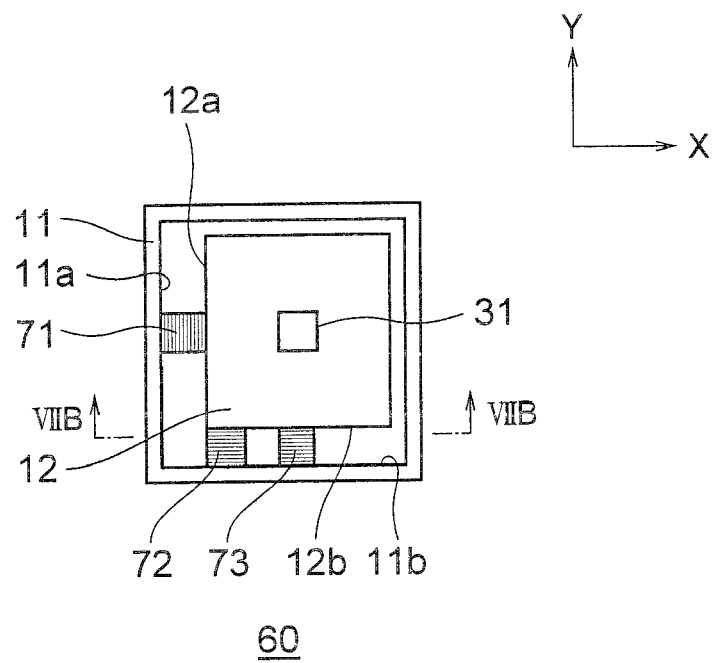
FIG. 7A is a plan view showing a structure of an inertial drive actuator according to a third embodiment of the present invention.
Figure 7B:
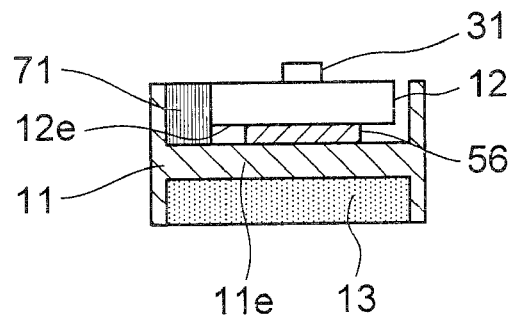
FIG. 7B is a cross-sectional view taken along a line VIIB-VIIB in FIG. 7A.

Next, an inertial drive actuator 60 according to a third embodiment of the present invention will be described below while referring to FIG. 7A and FIG. 7B. FIG. 7A is a plan view showing a structure of the inertial drive actuator 60 according to the third embodiment, and FIG. 7B is a cross-sectional view taken along a line VIIB-VIIB in FIG. 7A.

As shown in FIG. 7A, in the inertial drive actuator 60 according to the third embodiment, piezoelectric elements 72 and 73 (displacement generating mechanism) are disposed similarly as the piezoelectric elements 51 and 52 according to the second embodiment. Furthermore, a piezoelectric element 71 (displacement generating mechanism) is arranged such that one end thereof is adjacent to a substantial center of the left-side surface 12a of the vibration substrate 12, and the other end of the piezoelectric element 71 is arranged adjacent to the inner-side surface 11a of the fixed member 11.

In this structure, a direction of displacement of the piezoelectric element 71 is X-direction, and the direction of displacement intersects with Y-direction which is a direction of displacement of the piezoelectric elements 72 and 73 in a plane in which, there exist the piezoelectric elements 71, 72, and 73.

The rest of the structure of the inertial drive actuator 60 is similar to the inertial drive actuator 40 according to the second embodiment and the inertial drive actuator 10 according to the first embodiment, and same reference numerals are assigned to components which are same as in the first embodiment and the second embodiment.

By using the three piezoelectric elements 71, 72, and 73 as described above, it is possible to displace the vibration substrate 12 in X-direction, Y-direction, an inclined direction, and a direction of rotation, and the mobile object 31, with this displacement of the vibration substrate 12, can be moved in the direction of displacement of the piezoelectric element 71, a direction of rotating the vibration substrate 12 by the piezoelectric element 72, the direction of displacement of the piezoelectric element 73, or, a direction in which these directions cross.

The rest of the structure, operation, and effect are similar to that in the first embodiment or the second embodiment.

(Fourth Embodiment)

Figure 8A:
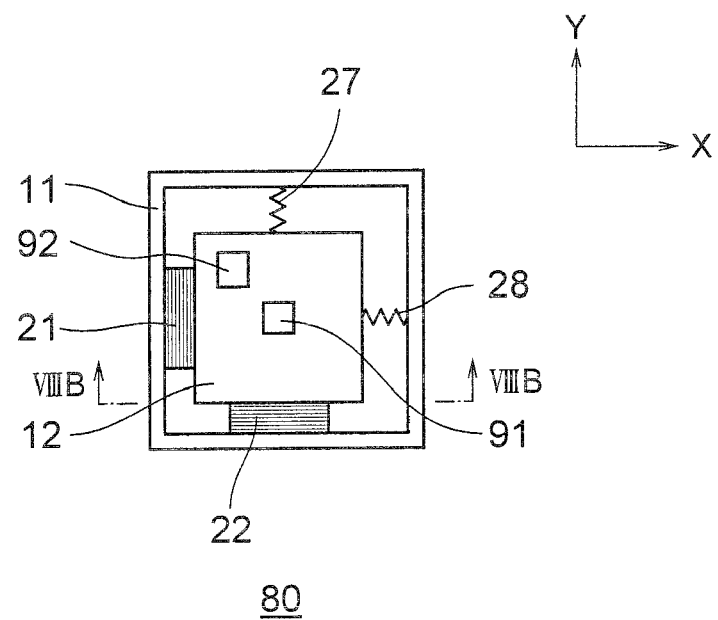
FIG. 8A is a plan view showing a structure of an inertial drive actuator according to a fourth embodiment of the present invention.
Figure 8B:
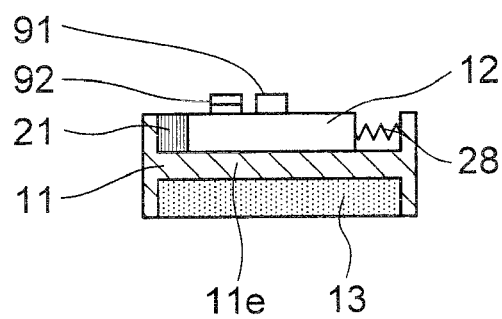
FIG. 8B is a cross-sectional view taken along a line VIIIB-VIIIB in FIG. 8A.
Figure 9:
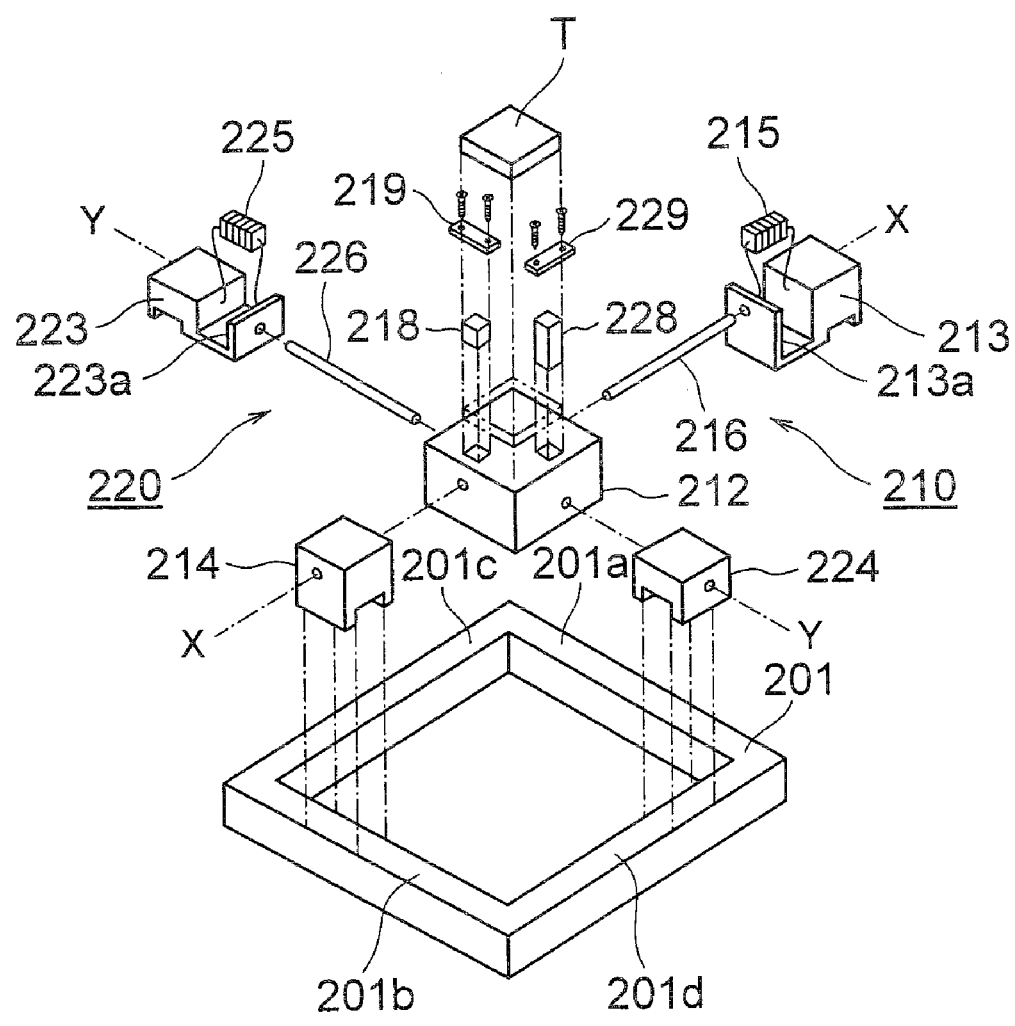
FIG. 9 is an exploded perspective view showing a structure of a conventional actuator.

Next, an inertial drive actuator 80 according to a fourth embodiment of the present invention will be described below by referring to FIG. 8A and FIG. 8B. FIG. 8A is a plan view showing a structure of an inertial drive actuator 80 according to the fourth embodiment, and FIG. 8B is a cross-sectional view taken along a line VIIIB-VIIIB in FIG. 8A.

As shown in FIG. 8A, two mobile objects 91 and 92 are mounted on the vibration substrate 12, which is a point at which the inertial drive actuator 80 according to the fourth embodiment differs from the inertia drive actuator 10 according to the first embodiment. The rest of the structure is similar to the inertial drive actuator 10 according to the first embodiment, and same reference numerals are assigned to components which are same as in the first embodiment.

The mobile objects 91 and 92 are separate and independent, and can be moved on the vibration substrate 12 as the mobile object 31 according to the first embodiment.

The rest of the structure, action, and effect are similar to that in the first embodiment.

In the embodiments from the first embodiment to the fourth embodiment described above, the mobile object electrode has been formed on the mobile object. However, without restricting to this, the mobile object electrode may be formed by letting the mobile object to be of an electroconductive material.

Furthermore, by letting the mobile object to be an magnetic material, and disposing a permanent magnet on the vibration substrate, at an opposite direction of the mobile object, it is possible to hold a position of the mobile object even when the electric potential difference between the mobile object electrode and the vibration substrate electrode is eliminated.

Moreover, when the vibration substrate 12 is displaceable, it is possible to use an element other than the piezoelectric element.

As it has been described above, the inertial drive actuator according to the present invention is useful for a small-size equipment in which, it is necessary to displace the mobile object minutely.

The inertial drive actuator according to the present invention shows an effect that, it is possible to make fewer the number of components, and to make a structure in which the high manufacturing accuracy is not sought, and accordingly, it is easy to make the size small.

What is claimed is:

1. An inertial drive actuator comprising:
    a first displacement generating mechanism of which, one end is adjacent to a fixed member, and a first displacement is generated in the other end thereof;
    a second displacement generating mechanism of which, one end is adjacent to the fixed member, and a second displacement is generated in the other end thereof;
    a vibration substrate which is connected to the other end of the first displacement generating mechanism and the other end of the second displacement generating mechanism, and which is displaceable in a plane in which, there exist a direction of the first displacement and a direction of the second displacement;
    a mobile object which is disposed to be facing the vibration substrate; and which moves with respect to the vibration substrate by inertia, with respect to a displacement of the vibration substrate; and
    a friction controlling mechanism which changes a frictional force between the mobile object and the vibration substrate.

2. The inertial drive actuator according to claim 1, wherein the vibration substrate has a vibration substrate electrode, and
    the mobile object has a mobile object electrode at a position facing the vibration substrate electrode, and
    an insulating layer is disposed between the vibration substrate electrode and the mobile object electrode, and
    the friction controlling mechanism generates an electric potential difference between the mobile object electrode and the vibration substrate electrode, and changes the frictional force between the vibration substrate and the mobile object by an electrostatic force of attraction based on the electric potential difference.

3. The inertial drive actuator according to claim 2, wherein the vibration substrate is displaceable in a direction which is not restricted to the direction of the first displacement and the direction of the second displacement, in the plane.

4. The inertial drive actuator according to claim 3, further comprising:
    a third displacement generating mechanism which generates a third displacement, wherein
    the first displacement generating mechanism is disposed near a center of the vibration substrate, and
    the second displacement generating mechanism is disposed at a position other than a position near the center of the vibration substrate such that, the direction of the first displacement and the direction of the second displacement are mutually parallel in the plane, and
    the third displacement generating mechanism is disposed at a position such that the direction of the first displacement and a direction of the third displacement intersect in the same plane.

5. The inertial drive actuator according to claim 4, wherein the mobile object is formed of an electroconductive material.

6. The inertial drive actuator according to claim 5, wherein the vibration substrate and the mobile object include a permanent magnet disposed opposite, and the mobile object is formed of a magnetic material.

7. The inertial drive actuator according to claim 6, wherein the mobile objects are in plurality, and it is possible to control the plurality of mobile objects independently.

8. The inertial drive actuator according to claim 2, wherein the first displacement generating mechanism and the second displacement generating mechanism are disposed such that the direction of the first displacement and the direction of the second displacement intersect in the plane.

9. The inertial drive actuator according to claim 8, wherein the mobile object is made of an electroconductive material.

10. The inertial drive actuator according to claim 9, wherein the vibration substrate and the mobile object include a permanent magnet disposed opposite, and the mobile object is formed of a magnetic material.

11. The inertial drive actuator according to claim 10, wherein the mobile objects are in plurality and it is possible to control the plurality of mobile object independently.

12. The inertial drive actuator according to claim 2, wherein the first displacement generating mechanism is disposed near a center of the vibration substrate, and the second displacement generating mechanism is disposed at a position other than a position near the center of the vibration substrate such that, the direction of the first displacement and the direction of the second displacement are mutually parallel in the plane.

13. The inertial drive actuator according to claim 12, further comprising:
    a third displacement generating mechanism which generates a third displacement, wherein
    the first displacement generating mechanism is disposed near a center of the vibration substrate, and
    the second displacement generating mechanism is disposed at a position other than a position near the center of the vibration substrate such that, the direction of the first displacement and the direction of the second displacement are mutually parallel in the plane, and
    the third displacement generating mechanism is disposed at a position such that the direction of the first displacement and a direction of the third displacement intersect in the same plane.

14. The inertial drive actuator according to claim 13, wherein the mobile object is formed of an electroconductive material.

15. The inertial drive actuator according to claim 14, wherein the vibration substrate and the mobile object include a permanent magnet disposed opposite, and the mobile object is formed of a magnetic material.

16. The inertial drive actuator according to claim 15, wherein the mobile objects are in plurality, and it is possible to control the plurality of mobile objects independently.

17. An inertial drive actuator comprising:
    a first displacement generating mechanism in which, a first displacement is generated;

a second displacement generating mechanism which generates a second displacement;

a vibration substrate which is connected to the first displacement generating mechanism and the second displacement generating mechanism, and which is displaceable in a plane in which, there exist a direction of the first displacement and a direction of the second displacement;

a mobile object which is disposed to be facing the vibration substrate, and which moves with respect to the vibration substrate by inertia with respect to a displacement of the vibration substrate, and a friction controlling mechanism which changes a frictional force between the mobile object and the vibration substrate.

18. The inertial drive actuator according to claim 17, wherein the vibration substrate has a vibration substrate electrode, and the mobile object has a mobile object electrode at a position facing the vibration substrate electrode, and an insulating layer is disposed between the vibration substrate electrode and the mobile object electrode, and the friction controlling mechanism generates an electric potential difference between the mobile object electrode and the vibration substrate electrode, and changes the frictional force between the vibration substrate and the mobile object by an electrostatic force of attraction based on the electric potential difference.

* * * * *